United States Patent [19]
Takezawa et al.

[11] Patent Number: 4,850,591
[45] Date of Patent: Jul. 25, 1989

[54] PNEUMATIC OPERATING DEVICE FOR GAME MACHINE

[75] Inventors: Keisuke Takezawa; Masatsugu Kamimori; Tsuyoshi Morohashi; Takashi Kubozono, all of Osaka, Japan

[73] Assignee: Capcom Co., Ltd., Osaka, Japan

[21] Appl. No.: 121,808

[22] Filed: Nov. 17, 1987

[30] Foreign Application Priority Data

Aug. 6, 1987 [JP] Japan ................... 62-196789

[51] Int. Cl.$^4$ .................................... A63B 67/00
[52] U.S. Cl. ................ 273/85 G; 273/1 E; 273/DIG. 28
[58] Field of Search ............ 273/37, 53, 54 R, 181, 273/391, 371, 374, 386, 1 E, 85 G, DIG. 28, 148 B; 92/33; 235/145 R; 200/81 R, 81.4, 81 H

[56] References Cited

U.S. PATENT DOCUMENTS

| | | | |
|---|---|---|---|
| 3,091,457 | 5/1963 | Mentzer et al. | 273/54 R |
| 3,603,983 | 9/1971 | Mitchell | 235/145 R |
| 4,630,832 | 12/1986 | Swanson | 273/374 |
| 4,665,558 | 5/1987 | Burke | 92/33 |

OTHER PUBLICATIONS

Easton, R. C. "Hydraulically Controlled Keyboard Interlock Mechanism", IBM Technical Disclosure Bulletin, vol. 14, No. 8, Jan. 1972.

*Primary Examiner*—Leo P. Picard
*Attorney, Agent, or Firm*—Birch, Stewart, Kolasch & Birch

[57] ABSTRACT

A pneumatic operating device particularly suited for a video boxing game machine in which a displayed boxer is made by a player to fight against an opponent. The device includes an air chamber whose volume is variable by applying an impact to a slider button. The air chamber is connected through a pressure transmission passage to a pressure sensor which detects the pressure variation within the air chamber to produce a corresponding electric signal for controlling the displayed boxer.

21 Claims, 8 Drawing Sheets

PNEUMATIC OPERATING DEVICE FOR GAME MACHINE

BACKGROUND OF THE INVENTION

1. Field of the Invention

This invention relates generally to game machines, and more particularly to an operating device for a video game machine which is improved so that different operating forces applied to the operating device cause different movements of a displayed image.

2. Description of the Background Art

Generally, video game machines comprise a CRT display device incorporated in a cabinet and a control panel provided with a plurality of operating devices. Each of the operating devices is operated to manipulate a corresponding one of displayed images.

In a boxing game, for example, one displayed boxer is manipulated by a first set of operating devices for one player, whereas the other displayed boxer is manipulated by a second set of operating devices for another player or computer-controlled in the case of the game being enjoyed by a single player. Each set of operating devices may include a universal operating rod for controlling the horizontal and vertical movements of a corresponding boxer, and at least one push button or switch for causing the boxer to make a punch.

Such a push button or switch provides only two states, that is "ON" state or "OFF" state. In other words, any different operating forces applied to the button result in the same "ON" state, causing the displayed boxer to make a single kind of punch such as jab or straight punch. Thus, the push button, though easy to operate, fails to simulate an actual punch. Rather, it is such ease of operation that makes the boxing game dull or boring.

Provision of two or more push buttons for each set of operating devices renders it possible to cause a corresponding displayed boxer to make different punches by actuating different buttons. In this case, however, the operation of different buttons is very cumbersome to the player who, for this reason, may erroneously operate them. More importantly, the kind of punches is determined by the selection of the buttons but not by the intensity of operating forces applied to the respective buttons. Thus, the provision of different push buttons still fails to give the player a feeling of actual boxing because a simulated boxing match is conducted only on the display screen without requiring simulated boxing movements of the player himself.

It is conceivable to replace the push button or buttons by a volume knob associated with a variable resistor, so that a displayed boxer makes punches of various impacts depending on the adjusted resistance of the resistor. However, the volume knob is not easy to operate quickly, so that it is not suited as an operating device for a boxing game machine. Further, the volume knob also fails to give the player a feeling of actual participation in a simulated boxing match on the display screen.

SUMMARY OF THE INVENTION

It is, therefore, an object of the present invention to provide an operating device for a game machine, wherein different operating forces applied to the operating device results in production of different control signals which may be used, in a video boxing game for example, to cause a displayed boxer to make various attacks.

Another object of the invention is to provide a pneumatic operating device in which a greater impact on the device always produces a larger control signal to vividly simulate an actual fighting match.

A further object of the invention is to enable prompt spontaneous restoration of the pneumatic operating device for a quickly repetitive operation.

According to the invention, there is provided a pneumatic operating device for a game machine comprising an air chamber the volume of which is variable upon applying an impact thereto, a pressure transmission passage connected at one end to said air chamber, and a pressure sensor connected to the other end of said passage for detecting the pressure therein to produce a corresponding electric signal.

With the above arrangement, the volume of the air chamber reduces upon impacting to increase the pressure therein, and this pressure increase is detected by the pressure sensor to produce an electric signal representative of the pressure increase The electric signal may be compared with a plurality of threshold values previously set in a computer which is incorporated in the game machine for controlling a displayed boxer for example. As a result of such comparison, the computer causes the boxer to make a punch depending on the intensity of the impacts applied to the operating device.

Other objects, features and advantages of the invention will be readily understood from the following detailed description.

BRIEF DESCRIPTION OF THE DRAWINGS

The invention will now be described further, by way of examples only, with reference to the accompanying drawings, in which.

DESCRIPTION OF THE PREFERRED EMBODIMENTS

Figure 1:
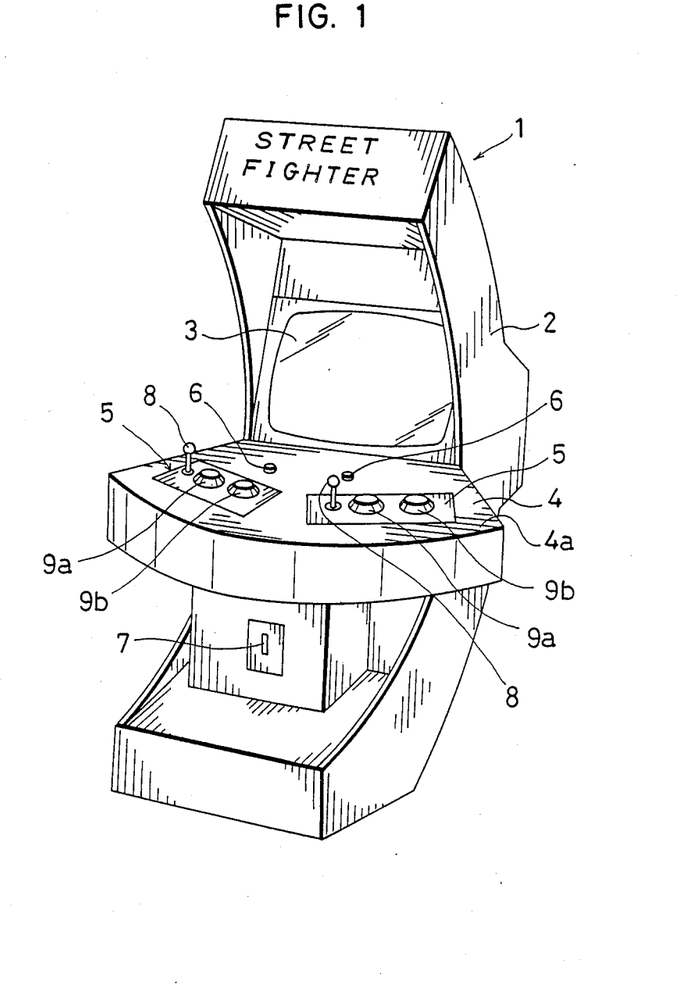
FIG. 1 is an overall perspective view of a video game machine to which the invention is advantageously applicable.

Referring now to FIG. 1 of the accompanying drawings, there is illustrated an overall view of a video game machine 1 which features any kind of fighting, such as boxing, kick-boxing, karate fighting, and/or street fighting.

The game machine 1 includes an upwardly extending cabinet 2 incorporating a CRT display 3 at an upper portion thereof so that the screen of the display faces forwardly. Immediately below the display 3 is disposed a sector-shaped horizontal table 4 which extends forward from the cabinet 2. The table 4 is provided with a pair of laterally spaced control units 5 and a pair of laterally spaced mode selection buttons 6. The cabinet 2 is further provided below the table 4 with a feed slot 7 for feeding a coin to put the machine 1 into operation.

One of the mode selection buttons 6 is actuated to select a game mode in which two players operate the respective control units 5 to manipulate two fighters (not shown) on the display screen 3. The other selection button is used to select another game mode in which one player operates one of the control units 5 to manipulate one of two fighters (not shown) on the screen, the other fighter being computer-controlled in this case.

Each control unit 5 comprises a universal operating rod 8 and a pair of pneumatic operating devices 9a, 9b.

The universal operating rod 8, which is well known in the art, is pivotally movable in all directions and operatively connected to a micro computer (not shown) incorporated in the housing 2 for causing a displayed fighter to make various movements. When the rod 8 is pivoted forward (toward the display 3) for example, the fighter is made to jump. Rearward pivoting (away from the display) of the rod causes the fighter to assume a crouching or half-sitting posture. Pivoting of the rod in the rightward or leftward direction in FIG. 1 causes the fighter to advance toward or retreat from the opponent. Further, pivoting of the rod in an oblique direction (forward-rightward, rearward-leftward, etc.) causes the fighter to make combined movements such as jumping forward or backward.

The two pneumatic operating devices 9a, 9b are also operatively connected to the incorporated computer and used for causing the fighter to make various attacks depending on the particular impacts applied thereto. According to the illustrated example, one of the pneumatic devices 9a, 9b is operated to cause the fighter to punch, whereas the other pneumatic device is used to make the fighter kick.

The computer may be further capable of quantitatively displaying at the screen 3 a cumulative damage given to each fighter by the opponent depending on the number and intensity of punches and/or kicks. When such damage increases over a predetermined amount, the fighting game or match will finish by one of the fighter knocking out the other. The computer may be programmed to make a judge decision in view of the cumulative damage of both fighters upon lapse of a time limit.

Figure 2:
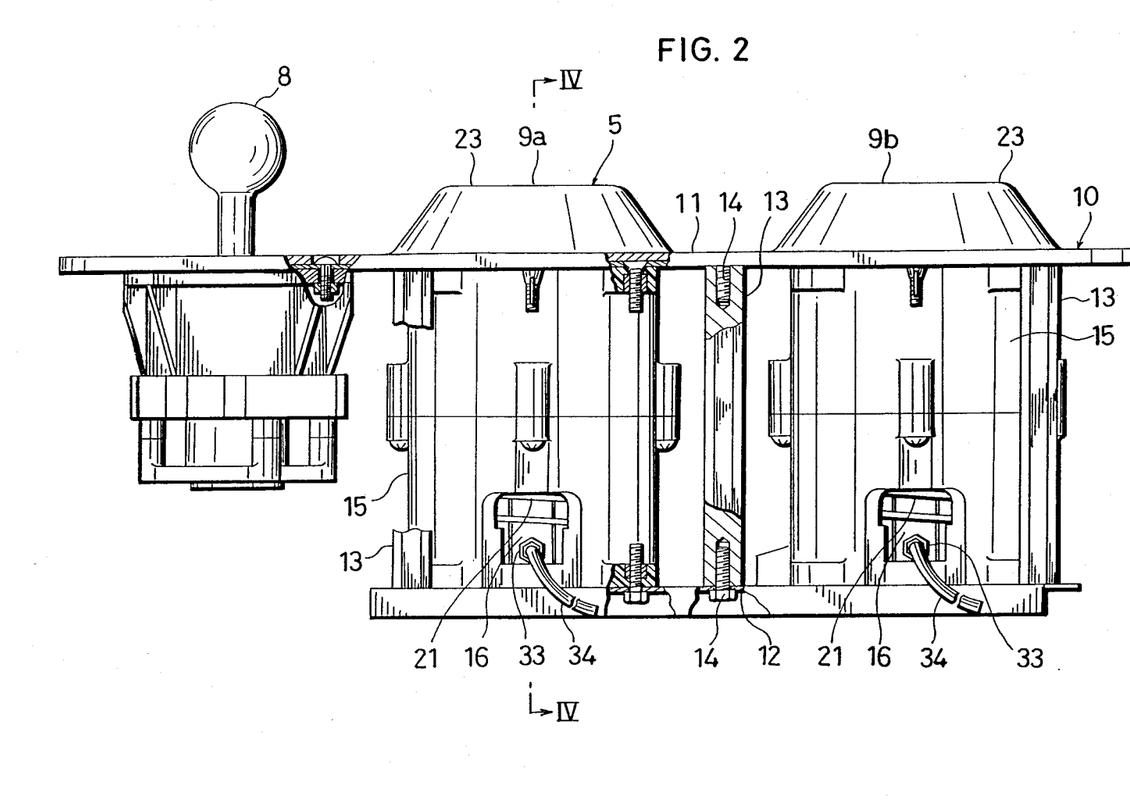
FIG. 2 is an enlarged front view of a pneumatic operating device according to the invention.
Figure 3:
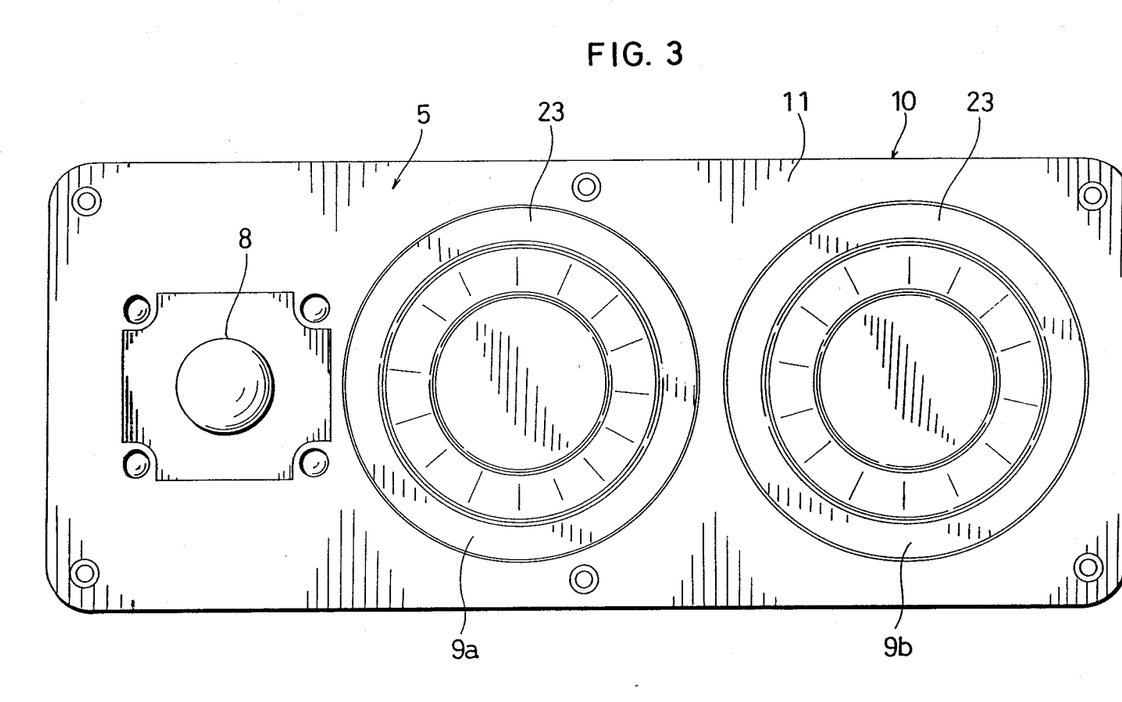
FIG. 3 is a plan view of the same.
Figure 4:
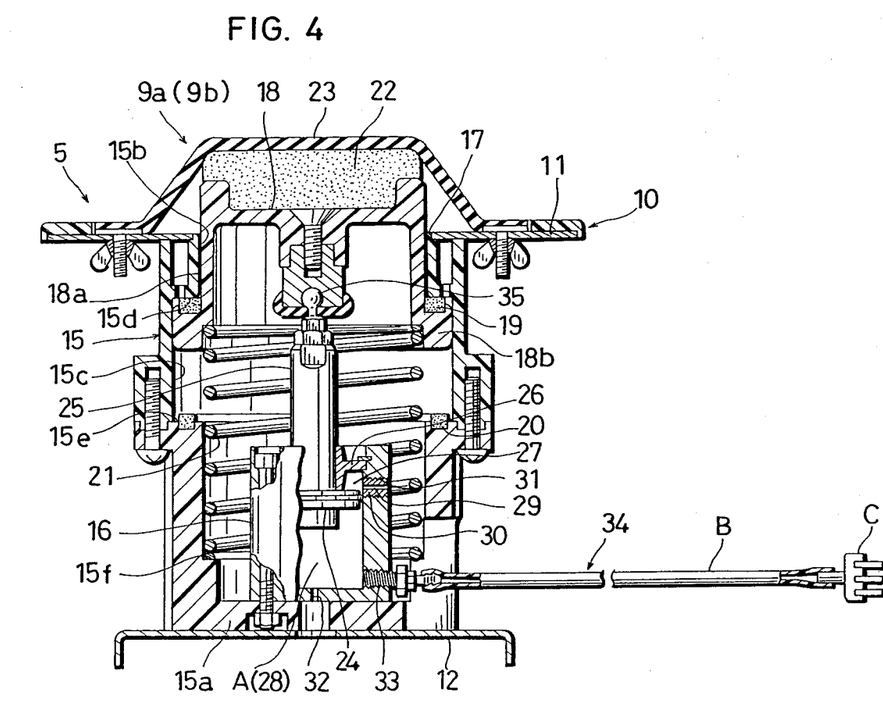
FIG. 4 is a sectional view taken on lines IV—IV in FIG. 2.

As illustrated in FIGS. 2 to 4, each control unit 5 includes a mounting frame 10 which is embedded in a rectangular bore of the horizontal table 4 (see also FIG. 1). The frame 10 carries a corresponding pair of pneumatic operating devices 9a, 9b together with a corresponding universal rod 8. The frame 10 comprises upper and lower horizontal plates 11, 12 which are connected together by means of tie rods 13 and end screws 14. The upper frame plate 11 is arranged substantially flush with the upper surface 4a of the horizontal table 4 (FIG. 1).

Each pneumatic operating device 9a (9b), which features the present invention, comprises an air chamber A whose volume is variable in response to a player's manual impact, a pressure transmission passage B communicating with the air chamber A, and a pressure sensor C for detecting the pressure within the passage B to produce an electric signal. According the example illustrated in FIGS. 2 to 4, the pneumatic operating device is provided in the form of a piston-cylinder assembly.

As best illustrated in FIG. 4, the piston-cylinder type operating device 9a (9b) comprises a bottomed cylindrical casing 15 fixed between the upper and lower frame plates 11, 12. The bottom wall 15a of the casing 15 fixedly supports thereon an air cylinder 16. The cylindrical wall of the casing 15 internally provides an upper guide surface 15b which is in alignment with a complementary opening 17 of the upper frame plate 11, and an intermediate guide surface 15c which is larger in diameter than the upper guide surface 15b, so that an upper stopper shoulder 15d is formed between the two guide surfaces 15b, 15c. The casing cylindrical wall is further provided with a lower stopper shoulder 15e located at the lower end of the intermediate guide surface 15c.

A slider button 18 is slidably received in the casing 15. More specifically, the button 18 has a cylindrical portion 18a slidably guided by the casing upper guide surface 15b as partially projecting thereabove. The button 18 further has an outer flange 18b which is slidably guided by the casing intermediate guide surface 15c. Thus, the button 18 is slidably movable up and down, but such slidable movement is limited by the upper and lower stopper shoulders 15d, 15e of the casing 15. The outer flange 18b is provided with a first buffer ring 19 for shock-absorbed abutment with the upper stopper shoulder 15d of the casing, whereas the lower stopper shoulder 15e of the casing is provided with a second buffer ring 20 for shock-absorbed abutment with the button flange 18b.

A compression coil spring 21 is interposed between the slider button 18 and an annular stepped portion 15f of the casing. Thus, the button 18 is always biased upward, so that its cylindrical portion 18a projects above the opening 17 of the frame upper plate 11.

The top of the slider button supports a sponge pad 22 which is covered by a button cover 23 made of rubber or some other elastic material. The marginal portion of the cover 23 is attached to the upper frame plate 11. In this way, the player's hand is protected when impacting against the slider button 18.

The air cylinder 16 slidably receives a piston 24 having an upwardly extending piston rod 25. The upper opening of the cylinder 16 is closed by a closure plate 26 which is slidably penetrated by the piston rod 25. The interior space of the cylinder 16 is divided by the piston 24 into upper and lower chambers 27, 28. According to the illustrated example, the lower chamber 28 provides to the air chamber A described hereinbefore.

The upper chamber 27 of the cylinder 16 communicates with a small-diameter plug 30 which is screwed into a threaded bore 31 port 29 formed in an externally threaded formed in the cylindrical wall of the cylinder 16.

Similarly, the lower chamber 28 of the cylinder 16 communicates with another small-diameter port 32 formed in the bottom wall of the cylinder 16. Further, the cylinder lower chamber 28 communicates with a pressure take-out port 33 which is connected by a flexible tube 34 to the pressure sensor C. In the illustrated example, the flexible tube 34 provides the pressure transmission passage B described hereinbefore.

The upper end of the piston rod 25 is connected to the center of the slider button 18 by means of a ball joint 35. Thus, upon depression of the button 18 against the urging force of the spring 21, the piston 24 is also lowered to reduce the volume of the cylinder lower chamber 28.

The pressure sensor C constitutes a part of a control circuit (not shown) incorporated in the micro computer. Such pressure sensor C is known and may be provided for example in the form of a diffused semiconductor pressure transducer.

In operation of the pneumatic operating device 9a (9b) described above, the slider button 18 is pressed downward against the biasing force of the spring 21 upon manual impact of the button 18. As a result, the piston 24, which is connected to the button 18, is also lowered to reduce the volume of the cylinder lower chamber 28.

The port 32 allows the compressed air within the lower cylinder chamber 28 to escape therethrough, but such air escape is limited due to the small cross-sectional area of the port 32. Thus, upon a fast downward stroke of the piston 24, the pressure within the lower cylinder chamber 28 temporarily rises to a high level because the air escape through the port 24 cannot catch up with the air compression within the chamber 28. A slower downward stroke of the piston 18, on the other hand, results in a smaller pressure rise due to compensating air escape through the port 32.

It should be noted in this connection that a larger overall stroke of the piston 24 does not always provide a larger pressure rise within the lower cylinder chamber 28. More specifically, a larger stroke of the piston 24 made in a longer time will often result in a smaller pressure rise than a smaller stroke of the piston 24 made in a shorter time. The determining factor is the speed of the piston stroke because the pressure within the lower cylinder chamber 32 is determined not only by the volume reduction of the chamber 32 but also by the amount of the air escaping through the port 32.

A harder punch or impact on the slider button 18 always causes a faster downward stroke of the piston 24, (but not necessarily a larger stroke) than a weaker impact. Thus, the pressure within the lower cylinder chamber 28 varies depending the intensity of the impact applied to the button 18.

The port 32 also serves to return the pressure within the lower cylinder chamber 28 to an atmospheric pressure after a temporary pressure rise, consequently protecting the pressure sensor C. Further, the port 32 allows entry of the external air into the lower cylinder chamber 28 when the slider button 18 is returned to its original upper limit position by the spring 21, thereby enabling successive impacting of the button 18. During the upward returning movement of the button, the port 29 naturally allows air escape from the upper cylinder chamber 27.

The pressure within the lower cylinder chamber 28 is detected through the flexible tube 34 by the pressure sensor C which then produces a corresponding electric signal such as a voltage. Such voltage signal is received and processed by the control circuit.

Figure 5A:
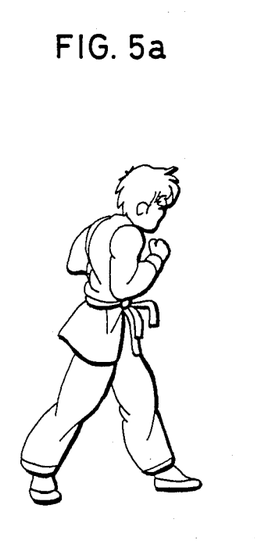
FIGS. 5a and 5b are illustrative views showing a series of movements made by a displayed fighter when making a jab.
Figure 5B:
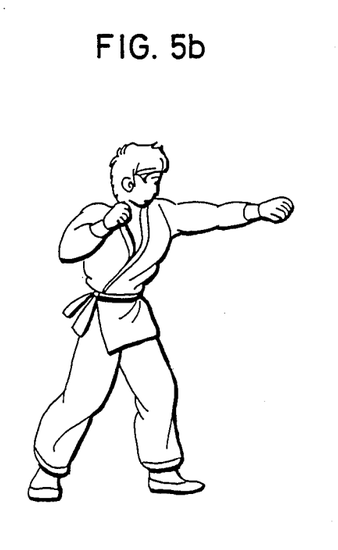
Figure 6A:
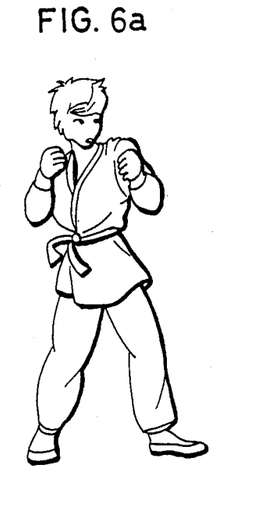
FIGS. 6a and 6b are illustrative views showing another series of movements made by the fighter when making a normal straight punch.
Figure 6B:
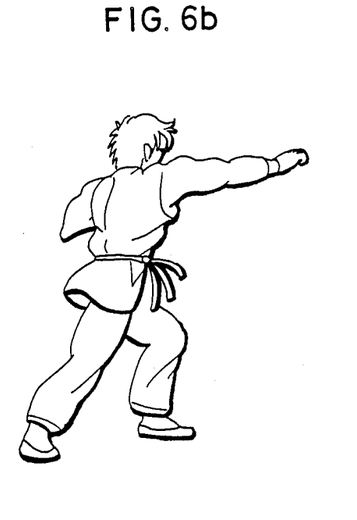
Figure 7A:
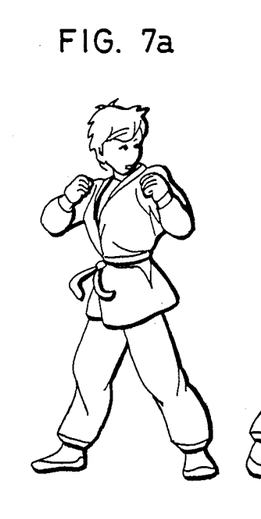
FIGS. 7a and 7b are illustrative views showing a further series of movements made by the fighter when making a harder straight punch.
Figure 7B:
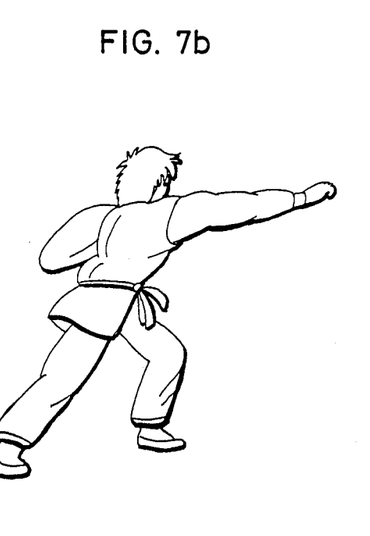
Figure 8A:
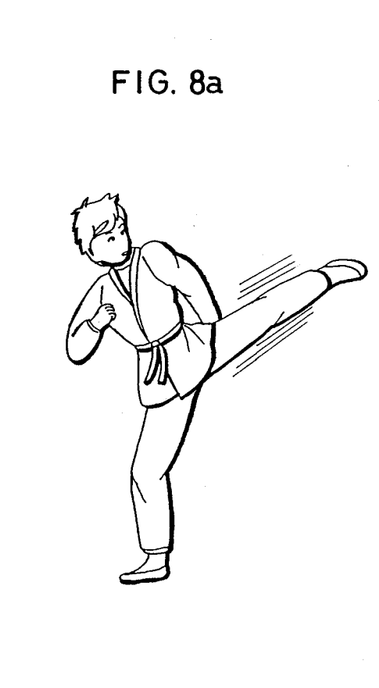
FIGS. 8a to 8c are also illustrative views respectively showing three different kinds of kicks made by the fighter.
Figure 8B:
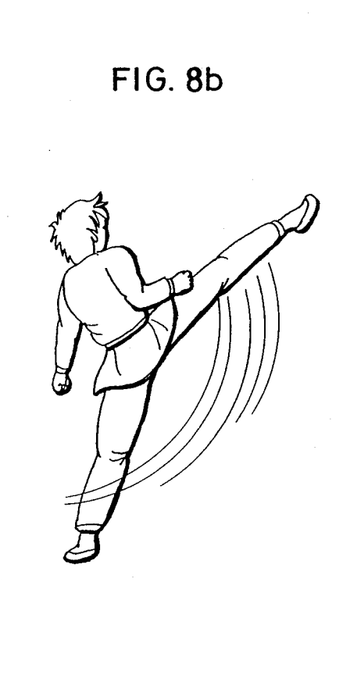
Figure 8C:
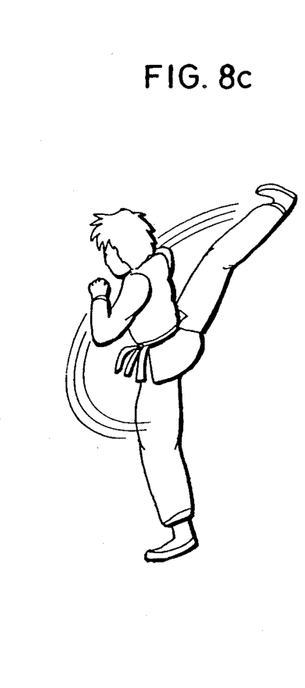

The control circuit may be designed to decide the movement of the displayed fighter depending on the value of a particular voltage signal relative to three different threshold values. If, for example, a received voltage signal is below the lowest threshold value, the fighter is controlled to make no punch nor kick. A voltage signal between the lowest and intermediate threshold values causes the fighter to make a jab (FIGS. 5a and 5b) or a lateral kick (FIG. 8a), giving a relatively small damage to the opponent. A voltage between the intermediate and highest threshold values controls the fighter to make a normal straight punch (FIGS. 6a and 6b) or a normal spin kick (FIG. 8b), thus giving a relatively large damage to the opponent. Finally, a voltage above the highest threshold value causes the fighter to make a harder straight punch (FIGS. 7a and 7b) or a back spin kick, thereby damaging the opponent to a maximum extent.

In this way, it is possible to control the intensity of a displayed fighter's punch or kick depending almost exactly on the intensity of an actual impact applied to each pneumatic operating device 9a (9b). Thus, the player can physically assimilate himself with a visually recognized fighting match, which is really enjoyable and exciting. Further, the game machine incorporating the pneumatic operating device provides a good physical exercise while enjoying the game.

Of course, the output of the sensor C may be compared with more than three threshold values to provide more than three kinds of attacks.

The pneumatic operating device is very simple in construction, so that it can be manufactured at a reasonable cost. Further, such simplicity renders the device less liable to operating troubles and failures.

The use of the flexible tube 34 in a suitable length as the pressure transmission passage B provides much freedom in the arrangement of the pneumatic operating device 9a (9b). For example, the operating device may be arranged at a position suitable for actual kicking by the player.

The port 32 communicating with the lower cylinder is provided to ensure that a greater impact on chamber 28 the slider button 18 with a smaller stroke thereof always causes a larger pressure rise than a weaker impact with a larger stroke. However, a greater impact on the button 18 usually results in a smaller stroke thereof than a weaker impact, so that the port 32 may be dispensed with if so desired.

Further, the closure plate 26 may be removed to open the space of the cylinder 16 above the piston 24 to the atmosphere. In this case, the port 29 becomes unnecessary.

Figures 9, 10, 11:
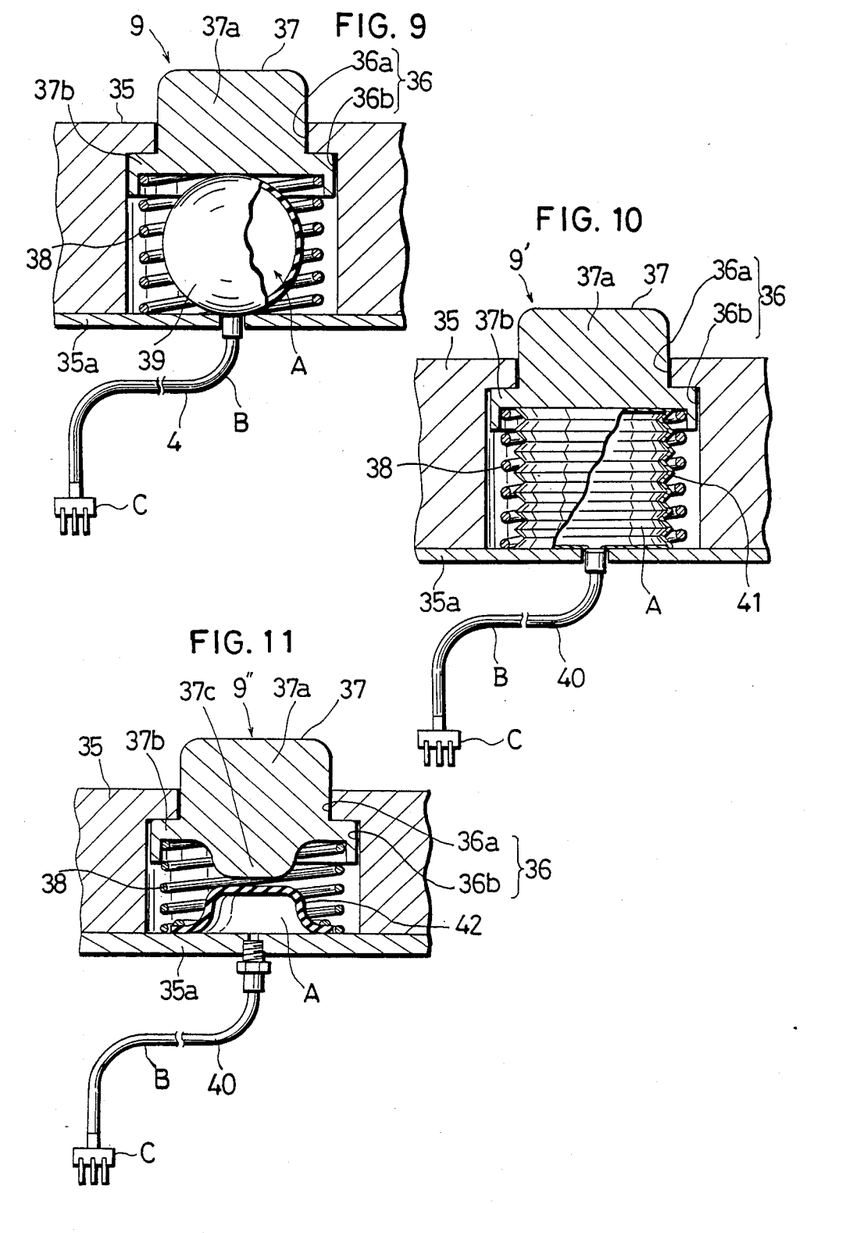
FIG. 9 is a sectional view showing a modified pneumatic operating device according to the invention.
FIG. 10 is a sectional view similar to FIG. 9 but showing another modified pneumatic operating device according to the invention.
FIG. 11 is a sectional view again similar to FIG. 9 but showing a further modified pneumatic operating device according to the invention.

FIG. 9 illustrates a modified pneumatic operating device 9 according to the invention. The device 9 comprises a base member 35 supported on a bottom plate 35a and formed with a guide bore 36 in which is slidably received a slider button 37. More specifically, the bore 36 has a upper cylindrical guide surface 36a and a lower cylindrical guide surface 36b which is smaller in diameter than the upper guide surface 36a, whereas the button 37 has a projecting pusher portion 37a slidably guided by the upper guide surface 36b of the bore 36 and an outer flange portion 37b slidably guided by the lower guide surface 36b. The button 37 is always urged upward by a compression coil spring 38 accommodated in the bore 36.

A rubber ball 39 is arranged between the slider button 37 and the bottom plate 35a and connected to a pressure sensor C by means of a flexible tube 40. The interior space of the ball 39 provides an air chamber A of variable volume, while the flexible tube 40 functions as a pressure transmission passage B.

Upon impact, the slider button 37 moves downward against the urging force of the spring 38 to compress the air chamber of the ball 39. The resultant pressure rise is detected by the sensor C for the purpose described hereinbefore.

In order to prevent the sensor C from being subjected to a high pressure for an unacceptably prolonged period, the ball 39 may be advantageously formed with a small port (not shown). In this case, the elasticity of the ball 39 should be so set as to enable spontaneous returning to its original spherical state.

FIG. 10 shows another modified pneumatic operating device 9' in which the ball 39 of FIG. 9 is replaced by a bellow 41. The device of this modification is otherwise the same as that of FIG. 9.

FIG. 11 illustrates still another modified pneumatic operating device 9" which is also very similar to the device 9 of FIG. 9 but differs therefrom in that a hat-shaped rubber member 42 is attached to the bottom plate 35a to define an air chamber A, and the slider button 37 has a downward central projection 37c for compressing the rubber member 42 upon descent of the button 37.

The invention being thus described, it is obvious that the same may be varied in many ways. For instance, the pressure transmission passage B may be provided by a metallic tube. Further, the pressure sensor C may be of any other types than a diffused semiconductor type pressure transducer, provided that it is capable of producing an electric signal which is representative of a particular pressure detected thereby. Such variations are not to be regarded as a departure from the spirit and scope of the invention, and all such modifications as would be obvious to those skilled in the art are intended to be included within the following claims.

We claim:
1. A game machine comprising:
   display means for displaying an image or images controlled by a player or players;
   at least one pneumatic operating device, said pneumatic operating device including
   a slider button which is hit by the player or players,
   an air chamber having a variable volume and operatively connected to said slider button in a manner such that the pressure within said air chamber varies when said slider button is hit by the player or players,
   a pressure transmission passage connected at one end to said air chamber,
   a pressure sensor connected to the other end of said passage for detecting the pressure therein, and
   means, responsive to said pressure sensor, for producing signals which vary as a function of the intensity of the impact applied to the slider button by the player or players.
2. The device as defined in claim 1, wherein said air chamber is formed with a port which is always open to the atmosphere for allowing escape and entry of air respectively upon volumetric reduction and an increase of said chamber.
3. The device as defined in claim 1, wherein
   said slider button is slidably guided by guide surface means and urged by a spring in a direction to cause volumetric increase of said air chamber.
4. The device as defined in claim 3, wherein
   said guide surface means includes a first cylindrical guide surface and a second cylindrical guide surface which is larger in diameter than said first guide surface, and
   said slider button has a projecting central pusher portion slidably guided by said first guide surface and an outer flange slidably guided by said second guide surface.
5. The device as defined in claim 3, wherein
   said guide surface means is provided by a cylindrical casing.
6. The device as defined in claim 1, wherein
   said air chamber is provided by a cylinder slidably receiving a piston, and
   said slider button is connected to said piston by means of a piston rod.
7. The device as defined in claim 6, wherein
   said cylinder is closed by a closure plate which is slidably penetrated by said piston rod, and
   the interior space of said cylinder is divided by said piston into a first chamber located closer to said slider button and a second chamber located farther from said button to serve as said air chamber.
8. The device as defined in claim 7, wherein
   each of said first and second chambers communicates with a port.
9. The device as defined in claim 1, wherein
   said slider button has a projecting pusher portion supporting a shock absorbing pad which is covered by a flexible protection cover.
10. The device as defined in claim 1, wherein
    said pressure transmission passage is provided by a flexible tube.
11. The device as defined in claim 1, wherein
    said pressure sensor is provided in the form of a diffused semiconductor pressure transducer.
12. A pneumatic operating device of a game machine including display means for displaying an image or images controlled by a player or players, the operating device comprising:
    a slider button which is hit by the player;
    an air chamber having a variable volume and operatively connected to said slider button in a manner such that the pressure within said air chamber varies when said slider button is hit by the player, wherein said air chamber is formed with a port which is always open to the atmosphere for allowing escape and entry of air respectively upon volumetric reduction and an increase of said chamber;
    a pressure transmission passage connected at one end to said air chamber; and
    a pressure sensor connected to the other end of said passage for detecting the pressure therein to produce a signal representative of the intensity of the impact applied to the slider button by the player.
13. The device as defined in claim 12, wherein said slider button is slidably guided by guide surface means and urged by a spring in a direction to cause volumetric increase of said air chamber.
14. The device as defined in claim 13, wherein said guide surface means includes a first cylindrical guide surface and a second cylindrical guide surface which is larger in diameter than said first guide surface, and
    said slider button has a projecting central pusher portion slidably guided by said first guide surface and an outer flange slidably guided by said second guide surface.

15. The device as defined in claim 12, wherein said guide surface means is provided by a cylindrical casing.

16. The device as defined in claim 12, wherein said air chamber is provided by a cylinder slidably receiving a piston, and said slider button is connected to said piston by means of a piston rod.

17. The device as defined in claim 16, wherein said cylinder is closed by a closure plate which is slidably penetrated by said piston rod, and he interior space of said cylinder is divided by said piston into a first chamber located closer to said slider button and a second chamber located further from said button to serve as said air chamber.

18. The device as defined in claim 17, wherein said first chamber is also formed with a port which is always open to the atmosphere for allowing escape and entry of air respectively upon volumetric reduction and increase of said first chamber.

19. The device as defined in claim 12, wherein said slider button has a projecting pusher portion supporting a shock absorbing pad which is covered by a flexible protection cover.

20. The device as defined in claim 12, wherein said pressure transmission passage is provided by a flexible tube.

21. The device as defined in claim 12, wherein said pressure sensor is provided in the form of a diffused semiconductor pressure transducer.

* * * * *